United States Patent [19]

Trubiano

[11] Patent Number: 5,348,323
[45] Date of Patent: Sep. 20, 1994

[54] INFANT SEAT PLATE FOR SHOPPING CART

[75] Inventor: Antoine Trubiano, Montreal, Canada

[73] Assignee: Cari-All Inc., Montreal, Canada

[21] Appl. No.: 39,739

[22] Filed: Mar. 30, 1993

[51] Int. Cl.⁵ .............................................. B62B 3/02
[52] U.S. Cl. ................................................ 280/33.993
[58] Field of Search ................. 280/33.993, 33.992, 280/33.991; 297/463, 250

[56] References Cited

U.S. PATENT DOCUMENTS

| | | | |
|---|---|---|---|
| 4,108,489 | 8/1978 | Salzman | 280/33.993 |
| 4,471,970 | 9/1984 | Trubiano | 280/33.933 |
| 4,682,782 | 7/1987 | Mills | 280/33.993 |

FOREIGN PATENT DOCUMENTS

| | | | |
|---|---|---|---|
| 2944575 | 5/1981 | Fed. Rep. of Germany | 280/33.993 |

*Primary Examiner*—Richard M. Camby
*Attorney, Agent, or Firm*—Oblon, Spivak, McClelland, Maier & Neustadt

[57] ABSTRACT

An infant seat plate for hinge securement adjacent a rear wall of a shopping cart is provided for blocking the leg holes in the rear wall of the shopping cart, and for positioning over a wire seat frame which is positionable against the leg holes in the rear basket area of the shopping cart. The seat plate has a hinge connecting edge and is biased by a spring element against the rear wall to obstruct the leg holes. The improvement in the seat plate resides in a releasable retention member being secured to the seat plate for retention engagement of the seat plate with the wire seat frame when positioned thereover in a position of use to arrest the seat plate over the seat frame. As soon as the rear gate of the shopping cart is displaced on its lower hinge against the rear wall, it releases the retention member and the seat plate is urged automatically against the rear wall.

12 Claims, 3 Drawing Sheets

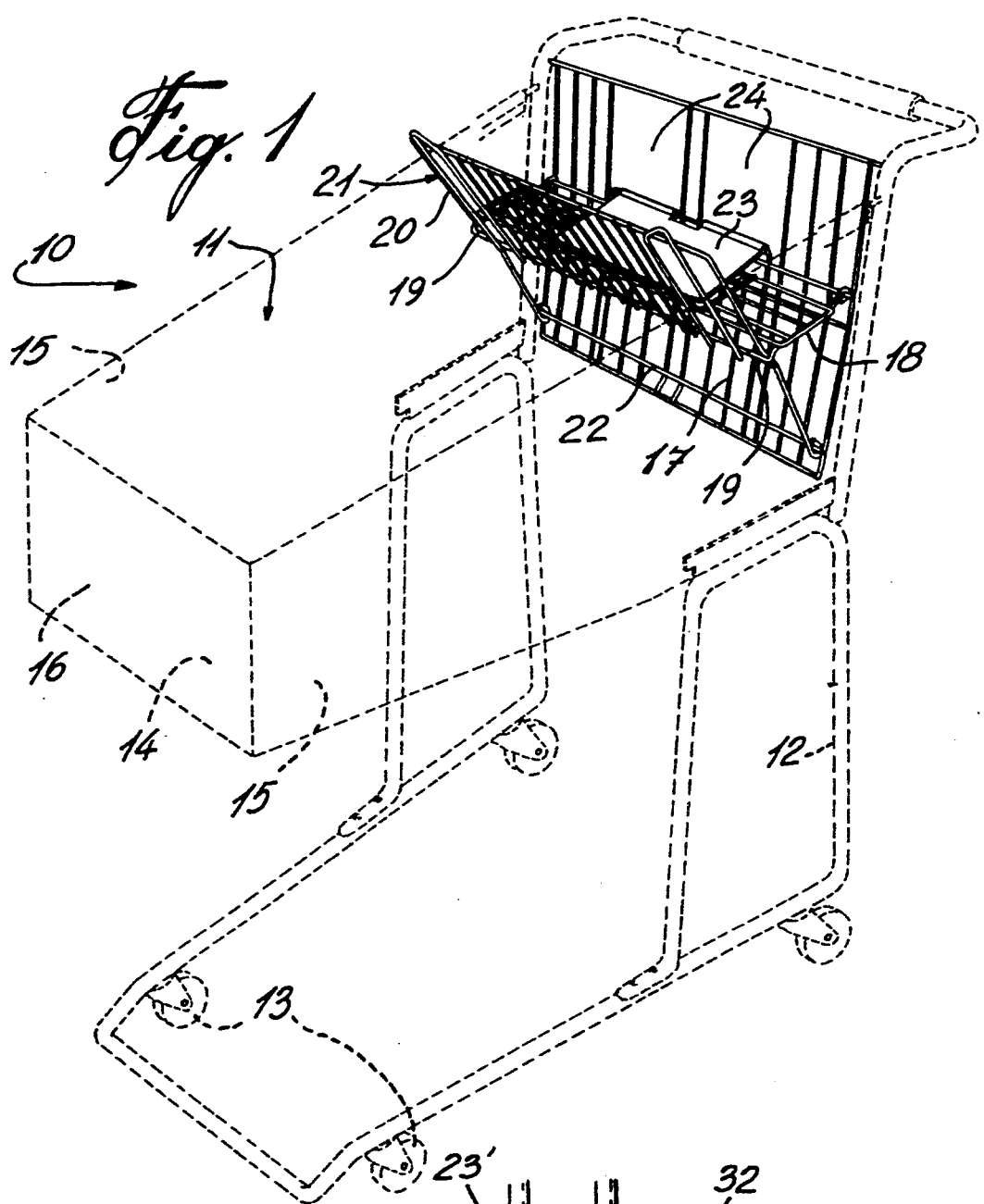
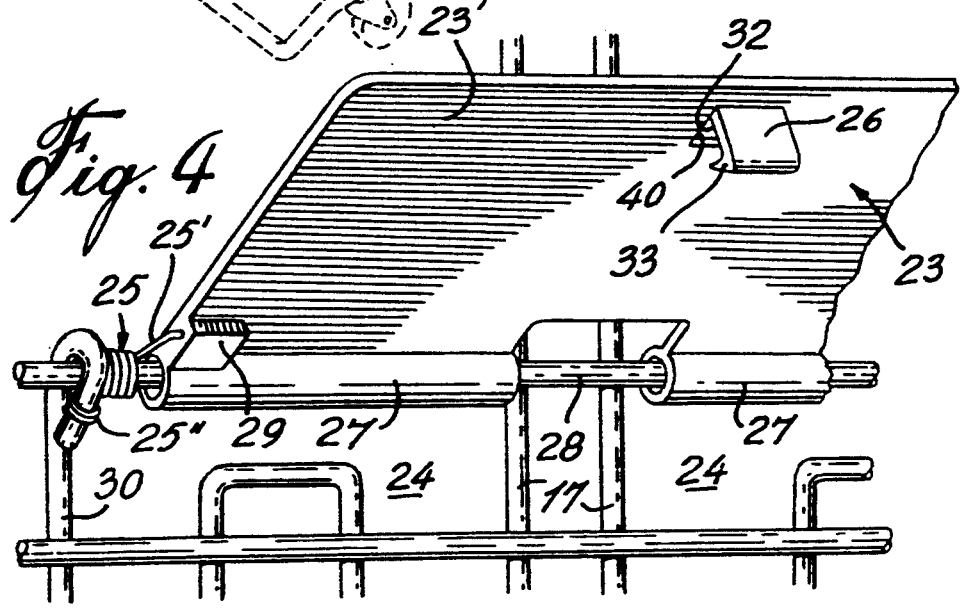

ics clearly described in that patent.
INFANT SEAT PLATE FOR SHOPPING CART

TECHNICAL FIELD

The present invention relates to an infant seat plate which is spring-biased against a rear wall of a shopping cart to obstruct the leg holes, and more specifically to a releasable retention means secured in the seat plate for retention engagement over the wire seat frame when positioned thereover in a position of use to arrest the seat plate over the seat frame to provide ease of placement of a child over the seat plate.

BACKGROUND ART

The present invention is an improvement of my baby seat plate as disclosed in my earlier U.S. Pat. No. 4,471,970 issued Sep. 18, 1984 and entitled "Resiliently biased seat panel for a seat frame of a push-cart." That patent discloses an infant seat plate which has a spring element which biases the seat plate against the leg holes of a rear wall of a shopping cart whereby the seat plate is automatically in a position against the rear wall to obstruct leg holes provided therein, whereby merchandise placed on the baby seat frame adjacent the rear wall does not fall through the leg holes. Biasing the seat plate against these leg holes provides various advantages as clearly described in that patent.

The present invention is an improvement of that seat plate wherein I provide a means to retain the seat plate against the seat frame, when the frame is in a position of use, to permit a person to use both hands for placing a child on the seat frame with the plate in position. In other words, the person does not have to hold the seat plate in position with one hand while placing the child in the seating compartment. Furthermore, it is necessary that when the carts are nested these seat plates return automatically to their position against the rear wall to obstruct the leg holes so that if the shopping cart is utilized with the baby seat compartment free of an infant, the shopper can safely place articles over the seat frame of the baby seat compartment with the leg holes being obstructed by the seat plate. With most shopping carts, not employing my seat plate as described in my above-referred-to patent, in most instances the seat plate lies over the seat frame with the leg holes being unobstructed, and this causes articles to fall through the leg holes and break often causing injury to people pushing the cart immediately in the area of the leg holes.

SUMMARY OF INVENTION

According to a feature of the present invention, there is provided an infant seat plate which is hingedly secured adjacent leg holes of a rear wall of a shopping cart and which is spring-biased against the leg holes to obstruct same, and wherein the seat plate is further provided with releasable retention means for retention engagement of the seat plate over a wire seat frame when positioned thereover in a position of use to arrest the seat plate over the seat frame.

Another feature of the present invention is to provide an infant seat plate for releasable retention over a wire seat frame of a baby seat compartment in a rear portion of a shopping cart, and wherein the seat plate is automatically detached from the seat frame when a hinge gate is moved towards the rear wall of the shopping cart.

Another feature of the present invention is to provide an infant seat plate as above mentioned which is easy to use and which provides added security to the baby seat compartment of a shopping cart.

According to the above features, from a broad aspect, the present invention provides an infant seat plate for hinge securement adjacent a rear wall of a shopping cart for blocking leg holes in the rear wall, and for positioning over a wire seat frame positionable adjacent the leg holes in a rear basket area of the shopping cart. The seat plate has a hinge connecting edge. Biasing means is provided for urging the seat plate against the rear wall to obstruct the leg holes therein. Releasable retention means is secured to the seat plate for retention engagement of the seat plate with the wire seat frame, when positioned thereover in a position of use, to arrest the seat plate over the seat frame. The releasable retention means exerts an engaging retention force with a wire rod of the wire seat frame. This retention force is greater than a restoring force acting on the seat plate by the biasing means for urging the plate towards the rear wall.

BRIEF DESCRIPTION OF DRAWINGS

A preferred embodiment of the present invention will now be described with reference to the accompanying drawings, in which:

FIG. 1 is a simplified perspective view of a shopping cart showing the location of the baby seat compartment provided with an infant seat plate;

FIG. 4 is an enlarged fragmented view showing the hinge connection of the seat plate to the rear wall of the shopping cart;

DESCRIPTION OF PREFERRED EMBODIMENTS

Figure 2:
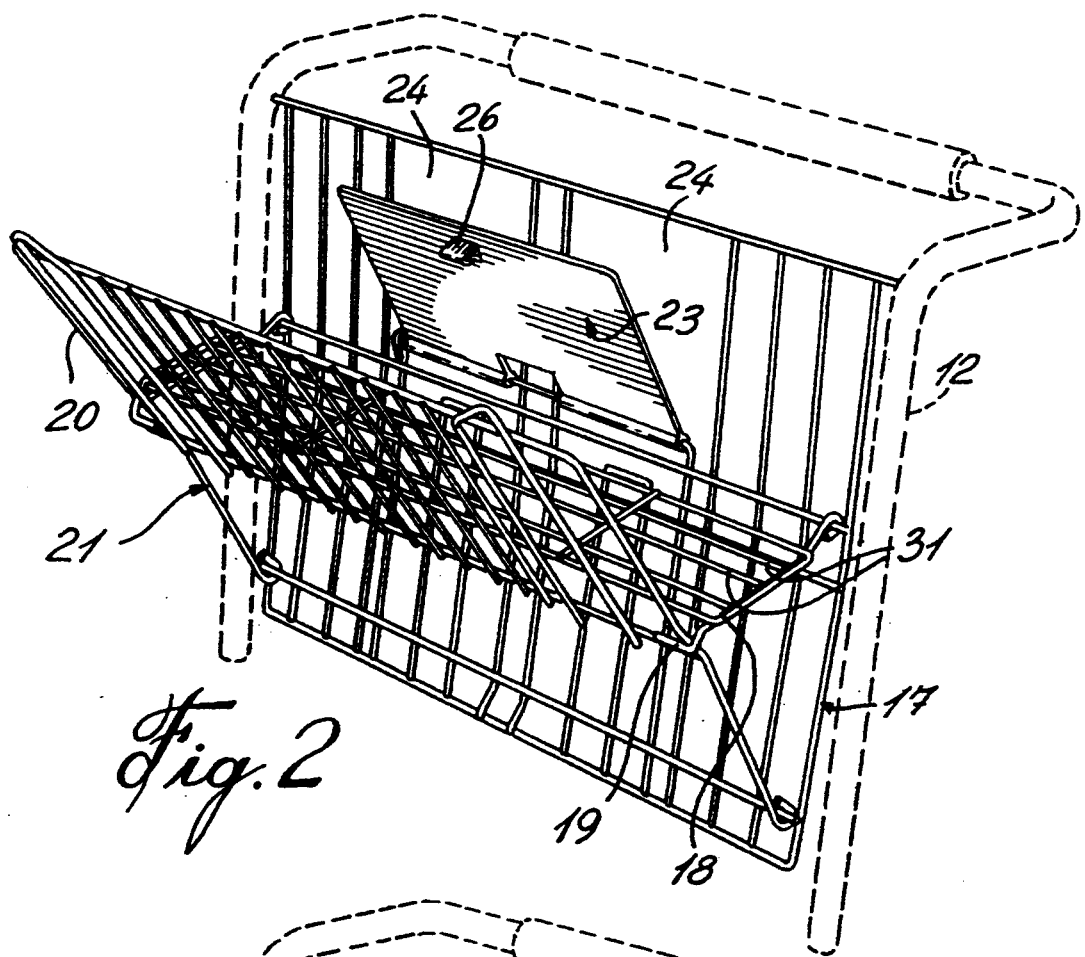
FIG. 2 is a perspective view of the baby seat compartment showing the seat plate of the present invention.
Figure 3:
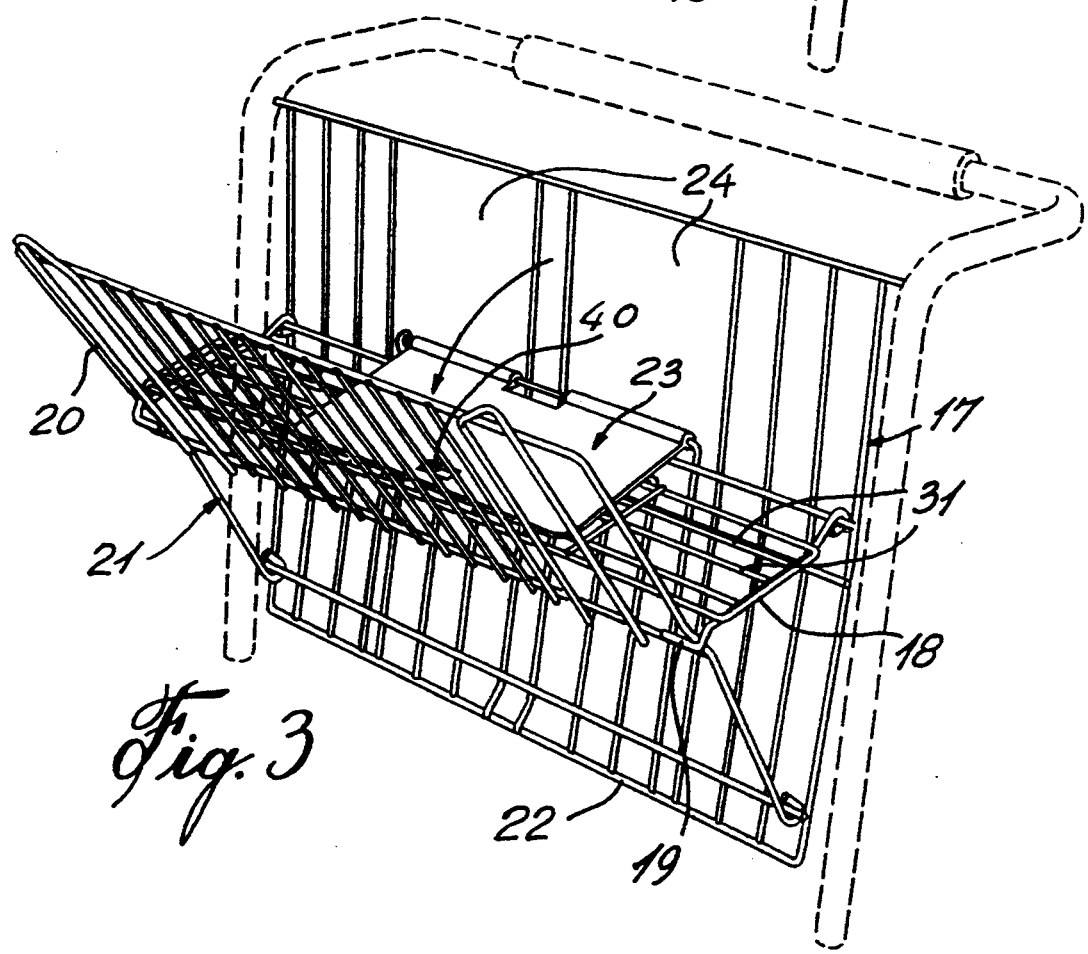
FIG. 3 is a view similar to FIG. 2 showing the seat plate in a position of use.

Referring now to the drawings, and more particularly to FIG. 1, there is shown generally at 10 a shopping cart comprised of a basket 11 secured elevated on a displaceable frame 12 supported on casters 13. The basket has a bottom wall 14, side walls 15, a front wall 16 and a rearwardly inclined rear wall 17 hinged at a top thereof to permit nesting of the carts. A wire seat frame 18 is hingedly secured along a hinge edge thereof to the rear wall 17 and slidingly attached at an opposed edge 19 to an upper section 20 of a hinge gate 21.

The hinge gate 21 is hinged adjacent a bottom edge thereof 22 to the rear wall 17 and displaceable against the rear wall on its hinge bottom edge 22 with the seat frame 18 between the rear wall 17 and the hinge gate 21.

The infant seat plate 23 is also hinged adjacent the rear wall 17 for blocking leg holes 24 formed in the rear wall and for positioning the seat plate 23 over the wire seat frame 18. As shown in FIG. 4, biasing means in the form of a spirally wound spring 25 is secured to the seat plate 23 to bias the plate against the rear wall 17 to obstruct the leg holes 24 formed therein. A releasable retention means in the form of a hook member 26 is secured to the rear face 23' of the seat plate 23 and protrudes therefrom for retention engagement of the seat plate with the wire seat frame 18 when positioned thereover in a position of use to arrest the seat plate 23 over the seat frame 18, as will be described in detail hereinbelow.

Having established the relationship of the infant seat plate 23 of the present invention with respect to the baby seat compartment formed in the rear section of a shopping cart, there will now be described the construction and operation of the seat plate of the present invention. Referring now to FIGS. 2 to 6, it can be seen that the seat plate 23 has a hinge edge formed by integrally formed tubes 27 to receive a hinge rod 28 therethrough with the rod forming part of the rear wall 17 of the shopping cart. The biasing means, herein a spirally wound spring 25 is secured at one end 25' in a spring attachment housing 29 and urges or biases the seat plate 23 against the rear wall 17. The other end 25" of the spring 25 is immovably secured to a stationary wire rod 30. The hook member 26 is molded integrally with the seat plate 23 which is formed of plastic material and positioned for clipping retention with a transverse wire rod 31 forming part of the wire seat frame 18 when the seat plate 23 is pushed over the seat frame 18 against the biasing force of the spring 25.

Figure 5:
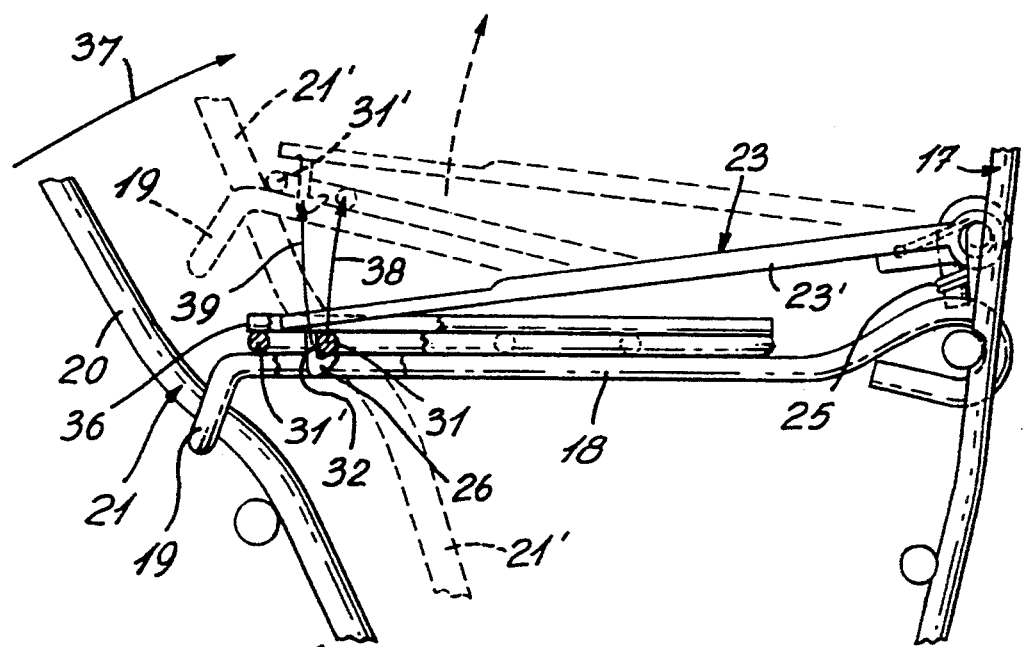
FIG. 5 is a simplified fragmented side view showing the seat plate engaged with the seat frame in a position of use.
Figure 6:
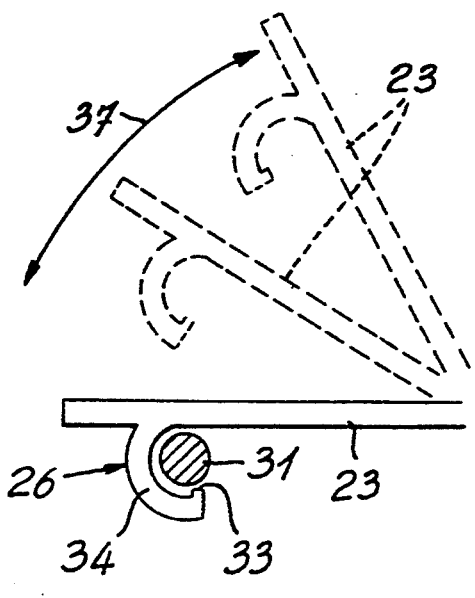
FIG. 6 is a simplified side view showing the displacement of the seat plate against its hinge from a position of use to a non-use position where it obstructs leg holes in the rear wall of a shopping cart.

The hook member 26 has various shapes, as shown in FIGS. 4 to 6, and defines a rearwardly extending mouth opening 32 between a lip portion 33 of the flange which extends parallel to the seat plate and which is spaced from the rear face 23' of the seat plate 23. The mouth opening 32 is aligned with an edge portion of a transverse wire rod 31 of the frame 18 for receiving at least a section of the wire rod 31 therein, as shown in FIGS. 5 and 6. The hook flange, as shown in FIGS. 4 and 5, is a flexible L-shape flange, whereas the flange as shown in FIG. 6 has a C-shape configuration with the lip 33 being a small inner extension at the end of the C-shape depending wall or flange 34.

Figure 7:
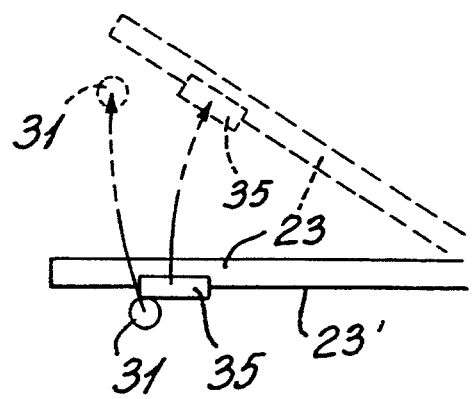
FIG. 7 is a view similar to FIG. 6 but wherein the releasable retention means is a magnet.

As shown in FIG. 7, it is conceivable that the releasing retention means be provided in the form of a magnet 35 which is glued to the rear face 23' of the seat plate at a position so that when the seat plate is placed over the wire rod seat frame 18, the magnet 35 is disposed adjacent a transverse wire rod 31 and held thereto by magnetic force. Accordingly, the magnetic force of the magnet 35 must exceed the spring force acting on the seat plate to urge it towards the rear wall. When the hinge gate 21 is displaced toward the rear wall 17, the rod 31 will be displaced away from the magnet and the force of the spring 25 would then urge the seat plate against the rear wall. It is also pointed out that although the biasing means as herein shown is a spirally wound spring 25, it is conceivable that other biasing elements may be provided, such as a leaf spring, etc.

With the seat plate positioned over the seat frame 18 and retained thereby, it is now possible for the user of the shopping cart to use both hands for placing a child on the seat plate 23 with the child's legs extending through the leg holes 24 in the rear wall.

The retention means, that is to say, the hook member 26 may be manually released from the seat frame by simply pulling up on the free edge 36 or side edges of the seat plate to disengage the hook member from the transverse wire rod 31. The spring 25 will then automatically raise the seat panel against the rear wall. Alternatively, by pulling the hinge gate 21 slightly rearwardly in the direction of arrow 37 towards the rear wall 17, the seat panel will automatically disengage. Because the seat frame 18 is slidingly attached at its opposed ends 19 to an upper section 20 of the hinge gate 21, the opposed ends 19 of the seat frame will rise up on the upper section 20 of the hinge gate 21, causing the transverse wire rod 31 to move out of engagement with the mouth opening 32, in the direction of arrow 38, releasing the seat plate and causing the spring to urge it against the rear wall 17. It is pointed out that the operation of the seat frame with respect to the hinge gate is well known in the art and described in my above-mentioned patent which is incorporated herein by reference. The position of the hinge gate as shown in phantom lines at 21' and the phantom position of one of the transverse rods 31' shows the direction of displacement of the seat frame with respect to the rear gate and the stationary rear wall 17 with the seat frame moving upwardly in the direction of arrow 39.

As clearly shown in FIG. 4, the hook member 26 has an aperture 40 formed adjacent thereto, and this aperture also shows the transverse wire rod received by the hook member.

It is within the ambit of the present invention to cover any obvious modifications of the preferred embodiment described herein, provided such modifications fall within the scope of the appended claims.

I claim:

1. An infant seat plate for hinge securement adjacent a rear wall of a shopping cart for blocking leg holes in said rear wall and for positioning over a wire seat frame positionable adjacent said leg holes in a rear basket area of said shopping cart, said seat plate having a hinge connecting edge, biasing means for urging said seat plate against said rear wall to obstruct said leg holes, and releasable retention means secured to said seat plate for retention engagement of said seat plate with said wire seat frame when positioned thereto in a position of use to arrest said seat plate over said seat frame, said releasable retention means exerting an engaging retention force with a wire rod of said wire seat frame, said retention force being greater than a restoring force acting on said seat plate by said biasing means for urging said plate towards said rear wall.

2. A seat plate as claimed in claim 1 wherein said releasable retention means is a hook member for clamping securement to a wire rod of said seat frame.

3. A seat plate as claimed in claim 1 wherein said hook member is a flexible hook flange defining a mouth opening extending between a lip of said flange extending parallel and spaced from a rear face of said seat plate, said mouth opening being aligned with said wire rod for receiving at least a section of said wire rod of said seat frame therein.

4. A seat plate as claimed in claim 3 wherein said hook flange is spaced inwardly from a top free edge of said seat plate and extends parallel thereto, said seat plate and hook flange being integrally molded from a plastic material.

5. A seat plate as claimed in claim 3 wherein said hook member is a flexible L-shape flange having a flange wall extending transverse to a rear face of said seat plate, and a retention lip formed at a free end of said flange wall and extending inwardly towards said hinge connecting edge of said seat plate, said lip being spaced from said rear face a distance sufficient to receive a section of said wire rod of said seat frame therein.

6. A seat plate as claimed in claim 1 wherein said releasable retention means is a magnet member secured to a rear face of said seat plate, said magnet member being aligned to lie adjacent said wire rod of said seat frame for magnetic retention of said seat plate over said seat frame.

7. A seat plate as claimed in claim 1 wherein said wire seat frame is hingedly secured against said rear wall of said shopping cart and slidingly attached at an opposed edge to an upper section of a hinge gate hinged adjacent a bottom edge thereof to said rear wall, said hinge gate when hingedly displaced against said rear wall on its hinged bottom edge causing said releasing retention means to disengage with said wire seat frame and to be urged against said rear wall by said biasing means.

8. In a shopping cart having a basket secured elevated on a frame supported on casters, said basket having a bottom wall, side walls, a front wall and a rearwardly sloping rear wall hinged at a top thereof; a wire seat frame hingedly secured along a hinge edge against said rear wall below leg holes formed in said rear wall, said wire seat frame being slidingly attached at an opposed edge to an upper section of a hinge gate, said hinge gate being hinged adjacent a bottom edge thereof to said rear wall and displaceable against said rear wall on its hinged bottom edge with said seat frame displaced on said hinge edge and disposed between said rear wall and said hinge gate, an infant seat plate hinged adjacent said rear wall for blocking said leg holes and for positioning over said wire seat frame, biasing means to urge said seat plate against said rear wall to obstruct said leg holes, and releasable retention means secured to said seat plate for retention engagement of said seat plate with said wire seat frame when positioned thereover in a position of use to arrest said seat plate over said seat frame, said releasable retention means exerting an engaging retention force with a wire rod of said wire seat frame, said retention force being greater than a restoring force acting on said seat plate by said biasing means for urging said plate towards said rear wall.

9. A shopping cart as claimed in claim 8 wherein said releasable retention means is a hook member for clamping securement to a wire rod of said seat frame.

10. A shopping cart as claimed in claim 9 wherein said hook member is a flexible hook flange defining a mouth opening extending between a lip of said flange extending parallel and spaced from a rear face of said seat plate, said mouth opening being aligned with said wire rod for receiving at least a section of said wire rod of said seat frame therein.

11. A shopping cart as claimed in claim 10 wherein said hook flange is spaced inwardly from a top free edge of said seat plate and extends parallel thereto, said seat plate and hook flange being integrally molded from a plastic material.

12. A shopping as claimed in claim 10 wherein said hook member is a flexible L-shape flange having a flange wall extending transverse to a rear face of said seat plate, and a retention lip formed at a free end of said flange wall and extending inwardly towards said hinge connecting edge of said seat plate, said lip being spaced from said rear face a distance sufficient to receive a section of said wire rod of said seat frame therein.

* * * * *